(12) United States Patent
Wang

(10) Patent No.: US 12,535,220 B2
(45) Date of Patent: Jan. 27, 2026

(54) REPLACEABLE MULTIFUNCTIONAL HEATING TABLE

(71) Applicant: Haohong Electric Technology (Hubei) Co., Ltd., Huanggang (CN)

(72) Inventor: Min Wang, Huanggang (CN)

(73) Assignee: Haohong Electric Technology (Hubei) Co., Ltd., Huanggang (CN)

( * ) Notice: Subject to any disclaimer, the term of this patent is extended or adjusted under 35 U.S.C. 154(b) by 367 days.

(21) Appl. No.: 18/301,006

(22) Filed: Apr. 14, 2023

(65) Prior Publication Data

US 2024/0219031 A1    Jul. 4, 2024

(30) Foreign Application Priority Data

Jan. 4, 2023   (CN) .......................... 202320018724.3

(51) Int. Cl.
*F24C 3/00* (2006.01)
*A47B 31/02* (2006.01)
*F24C 3/12* (2006.01)

(52) U.S. Cl.
CPC .............. *F24C 3/002* (2013.01); *A47B 31/02* (2013.01); *F24C 3/122* (2013.01)

(58) Field of Classification Search
CPC .......... F24C 3/002; F24C 3/122; A47B 37/04; A47B 31/02
See application file for complete search history.

(56) References Cited

U.S. PATENT DOCUMENTS

| 10,264,920 | B2* | 4/2019 | Fulp ..................... A47J 37/0781 |
| 2005/0109331 | A1* | 5/2005 | Chao .................... A47J 37/0781 |
| | | | 126/39 R |
| 2006/0054160 | A1* | 3/2006 | Borowske ................. F24B 3/00 |
| | | | 126/512 |
| 2016/0166109 | A1* | 6/2016 | Banal ..................... A47B 11/00 |
| | | | 108/50.13 |
| 2022/0090798 | A1* | 3/2022 | Ritchie ................... F24B 1/028 |

* cited by examiner

*Primary Examiner* — Alfred Basichas
(74) *Attorney, Agent, or Firm* — Westbridge IP LLC

(57) ABSTRACT

Disclosed is a replaceable multifunctional heating table including a table frame, a heating assembly and an extension structure. A desktop plate is provided at an upper end of the table frame, and an installation hole is formed in a middle portion of the table plate. The heating assembly includes a combustion pipe provided inside the table frame and is corresponding to the installation hole. The extension structure includes a cover, a tea set and a grill. The cover is configured to cover the installation hole, the tea set is provided on the installation hole, and the grill is provided on the installation hole. One of the cover, the tea set and the grill is provided on the installation hole to make the replaceable multifunctional heating table have a plurality of usage modes.

9 Claims, 5 Drawing Sheets

REPLACEABLE MULTIFUNCTIONAL HEATING TABLE

CROSS-REFERENCE TO RELATED APPLICATIONS

This application claims priority to Chinese Patent Application No. 202320018724.3, filed on Jan. 4, 2023, the entire contents of which are incorporated herein by reference.

TECHNICAL FIELD

The embodiments of the present application relate to the technical field of multifunctional tables, and in particular to a replaceable multifunctional heating table.

BACKGROUND

The existing tables have single functions and poor usability, but with the continuous development of science and technology, the industrialization process continues to accelerate, making smart homes more and more widespread. In addition, with the continuous rise in property prices and restrictions by economic strength, small apartments have become the first choice for most people when buying a house. Limited by the space in small apartments, more and more multifunctional furniture which can save space are accepted by consumers. The current dining table with a single function can no longer meet the requirements of modern people for the diversified furniture.

SUMMARY

The main objective of the present disclosure is to provide a replaceable multifunctional heating table, aiming to provide a multifunctional heating table.

In order to achieve the above objective, the present disclosure provides a replaceable multifunctional heating table, including:
  a table frame, a desktop plate is provided at an upper end of the table frame, and an installation hole is formed in a middle portion of the table plate;
  a heating assembly including a combustion pipe, the combustion pipe is provided inside the table frame and is corresponding to the installation hole; and
  an extension structure including a cover, a tea set and a grill, the cover may be provided on the installation hole, the tea set may be provided on the installation hole, and the grill may be provided on the installation hole,
  one of the cover, the tea set and the grill may be provided on the installation hole to make the replaceable multifunctional heating table have a plurality of usage modes.

In an embodiment, the table frame is hollow, and includes an air inlet port and an air outlet port, and the air inlet port is circumscribed to a pressure reducing valve,
  the heating assembly further includes a first air inlet pipe, a second air inlet pipe and a regulating valve, the first air inlet pipe enters the table frame via the air inlet port, and leaves the table frame via the air outlet port, the first air inlet pipe is connected to the second air inlet pipe through the regulating valve, and the second air inlet pipe communicates with the combustion pipe, and
  the heating assembly further includes a regulating button for adjusting the regulating valve.

In an embodiment, the heating assembly includes an ignition control device, the ignition control device includes an ignition mechanism, and the ignition mechanism includes an ignition needle provided with an ignition port, and the ignition needle communicates with the ignition mechanism through a first wire,
  the ignition control device further includes a sensing needle, and the sensing needle is electrically connected to the regulating valve through a second wire, and is configured to sense a combustion signal, and
  the heating assembly further includes an ignition button for adjusting the ignition mechanism, and the ignition port communicates with the combustion pipe.

In an embodiment, an installation groove is formed at an end of the table plate,
  the table plate further includes a first base and a cover plate in the installation groove, the first base is detachably covered by the cover plate, and the regulating button is spaced apart from the ignition button in the first base, and
  the cover plate is provided with at least one first through hole.

In an embodiment, a gas collection cover is provided on both peripheries of the sensing needle and the ignition needle, and the gas collection cover is provided with a plurality of second through holes.

In an embodiment, a second base is provided under the combustion pipe, and
  the second base is provided with a first perforation for the second air inlet pipe to pass through, a second perforation for the ignition needle to pass through, and a third perforation for the sensing needle to pass through.

In an embodiment, the first base is provided with a fourth perforation for the first wire to pass through, and a fifth perforation for the second wire to pass through.

In an embodiment, the combustion pipe is provided with a plurality of third through holes,
  a periphery of the combustion pipe is provided with an outer furnace wall,
  an inner furnace wall is provided between the outer furnace wall and the combustion pipe, and a gap is formed between the outer furnace wall and the inner furnace wall, and
  the outer furnace wall is detachably covered by the cover body, and the cover body is provided with at least one fourth through hole.

In an embodiment, both ends of the combustion pipe are provided with a support base, and the support base is installed on the inner furnace wall.

In an embodiment, a head end of the table frame is connected to a tail end of the table frame, forming a frame along both a length direction and a width direction of the table frame.

In the technical solution of the present disclosure, the installation hole is formed in the middle portion of the table plate, to adapt to various extension structures, so that the heating table has a plurality of usage modes. One of the cover, the tea set and the grill may be provided on the installation hole, so that the replaceable multifunctional heating table has various functions, such as the heating function, the tea table function, the barbecue function, and the like. The heating assembly is hidden inside the table frame. In this way, not only various functions can be achieved in one table and the user can be kept warm, but also the replaceable multifunctional heating table can be used in combination with other products freely.

BRIEF DESCRIPTION OF THE DRAWINGS

To illustrate the technical solutions according to the embodiments of the present disclosure or the related art more clearly, the accompanying drawings for describing the embodiments or the related art are introduced briefly in the following. Apparently, the accompanying drawings in the following description are only some embodiments of the present disclosure. Persons of ordinary skill in the art can derive other drawings from the structures of the accompanying drawings without creative efforts.

Figure 1:
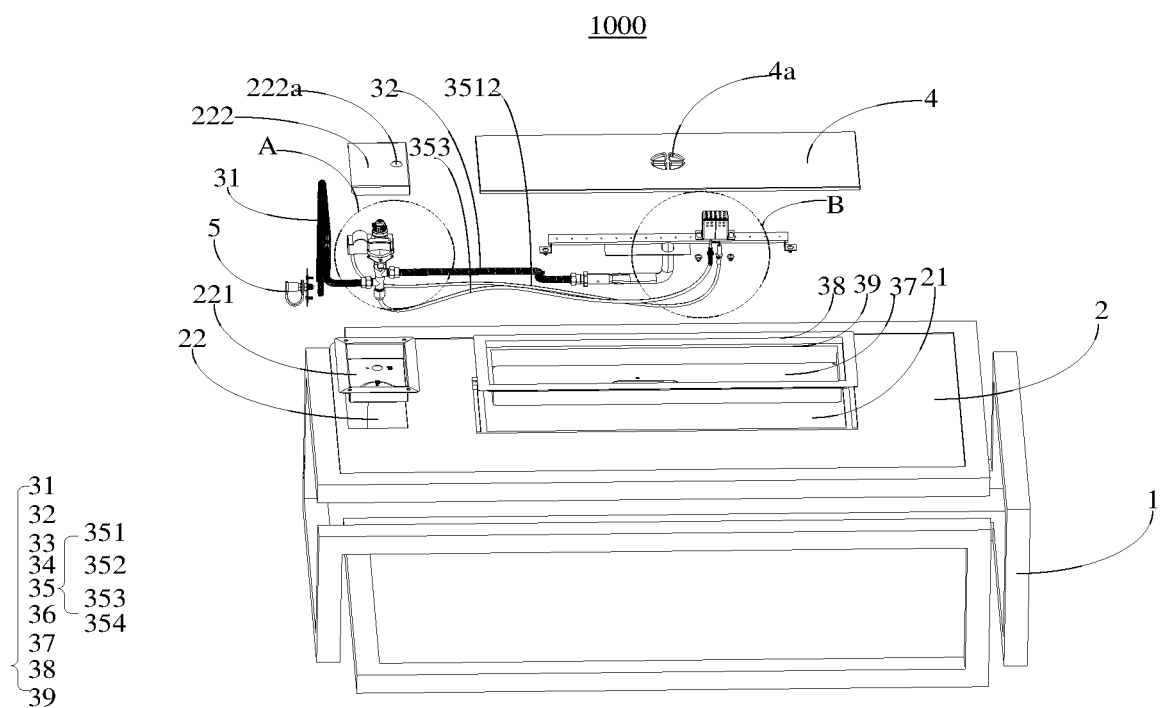
FIG. 1 is an exploded schematic structure view of a replaceable multifunctional heating table according to an embodiment of the present disclosure from a first perspective.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described clearly in the following with reference to the accompanying drawings. It is obvious that the embodiments described are only some rather than all of the embodiments of the present disclosure. Based on the embodiments of the present disclosure, all other embodiments obtained by those skilled in the art without creative efforts shall fall within the scope of the present disclosure.

It should be noted that all the directional indications (such as up, down, left, right, front, rear . . . ) in the embodiments of the present disclosure are only used to explain the relative positional relationship, movement, or the like of the components in a certain posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present disclosure.

The existing tables have single functions and poor usability, but with the continuous development of science and technology, the industrialization process continues to accelerate, making smart homes more and more widespread. In addition, with the continuous rise in property prices and restrictions by economic strength, small apartments have become the first choice for most people when buying a house. Due to the limited space of small apartments, more and more multifunctional furniture which can save space are accepted by consumers. The current dining table with a single function can no longer meet the requirements of modern people for the diversified furniture.

In order to solve the above problems, the present disclosure provides a replaceable multifunctional heating table, aiming to provide a multifunctional heating table. FIG. 1 to FIG. 5 show the embodiments of the replaceable multifunctional heating table.

As shown in FIG. 1 to FIG. 5, the present disclosure provides a replaceable multifunctional heating table 1000, including a table frame 1, a heating assembly 3 and an extension structure. A desktop plate 2 is provided at an upper end of the table frame 1, and an installation hole 21 is formed in a middle portion of the table plate 2. The heating assembly 3 includes a combustion pipe 34. The combustion pipe 34 is provided in the table frame 1 and is corresponding to the installation hole 21. The extension structure includes a cover 4, a tea set and a grill. The cover 4 may cover the installation hole 21. The tea set may be provided on the installation hole 21, and the grill may be provided on the installation hole 21. One of the cover 4, the tea set and the grill may be provided on the installation hole 21, to make the replaceable multifunctional heating table 1000 have a plurality of usage modes.

In the technical solution of the present disclosure, the installation hole 21 is formed in the middle portion of the table plate 2, to adapt to various extension structures, so that the heating table has a plurality of usage modes. One of the cover 4, the tea set and the grill may be provided on the installation hole 21, so that the replaceable multifunctional heating table 1000 has various functions, such as the heating function, the tea table function, the barbecue function, and the like. The heating assembly 3 is hidden inside the table frame 1. In this way, not only various functions can be achieved in one table, but also the replaceable multifunctional heating table 1000 can be used in combination with other products freely.

Figure 4:
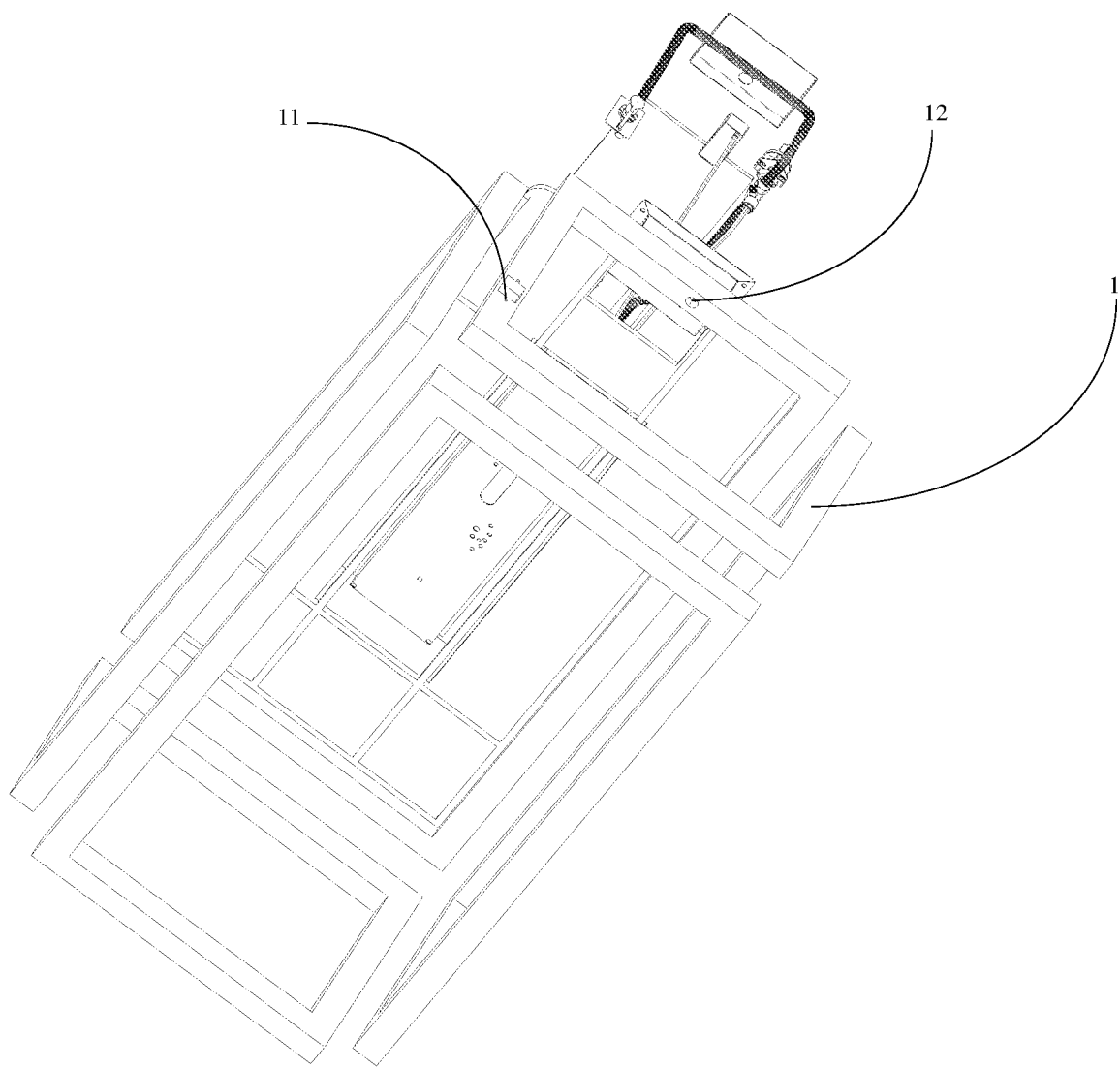
FIG. 4 is an exploded schematic structure view of the replaceable multifunctional heating table according to an embodiment of the present disclosure from a second perspective.

In order to further realize the heating function of the heating assembly 3, as shown in FIG. 1 and FIG. 4, in an embodiment of the present disclosure, the table frame 1 is hollow, and includes an air inlet port 11 and an air outlet port 12. The air inlet port 11 is circumscribed to a pressure reducing valve 5. The heating assembly 3 further includes a first air inlet pipe 31, a second air inlet pipe 32 and a regulating valve 33. The first air inlet pipe 31 enters the table frame 1 via the air inlet port 11, and leaves the table frame 1 via the air outlet port 12. The first air inlet pipe 31 is connected to the second air inlet pipe 32 through the regulating valve 33, and the second air inlet pipe 32 communicates with the combustion pipe 34. The heating assembly 3 further includes a regulating button 331 for adjusting the regulating valve 33. When the heating assembly 3 is in use, the heating assembly 3 is circumscribed to the gas supply device, and the combustible gas enters the regulating valve 33 from the first air inlet pipe 31. The regulating button 331 is used to control the regulating valve 33 to open or close. When the regulating valve 33 opens, the combustible gas enters the second air inlet pipe 32 from the first air inlet pipe 31, and the second air inlet pipe 32 communicates with the combustion pipe 34, so that the combustible gas will burn in the combustion pipe 34 to realize the heating function. The first air inlet pipe 31 is hidden inside the table frame 1, to prevent the pipe from being exposed outside and affecting the appearance of the replaceable multifunctional heating table 1000.

Figure 2:
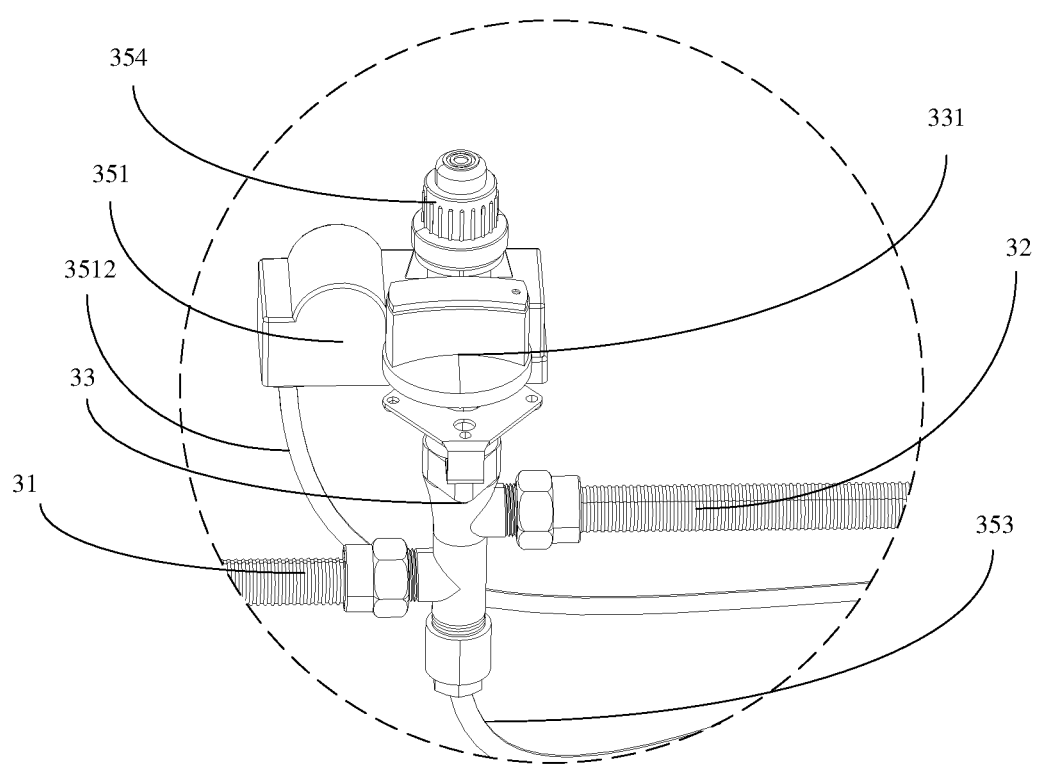
FIG. 2 is an enlarged schematic view at portion A in FIG. 1.
Figure 3:
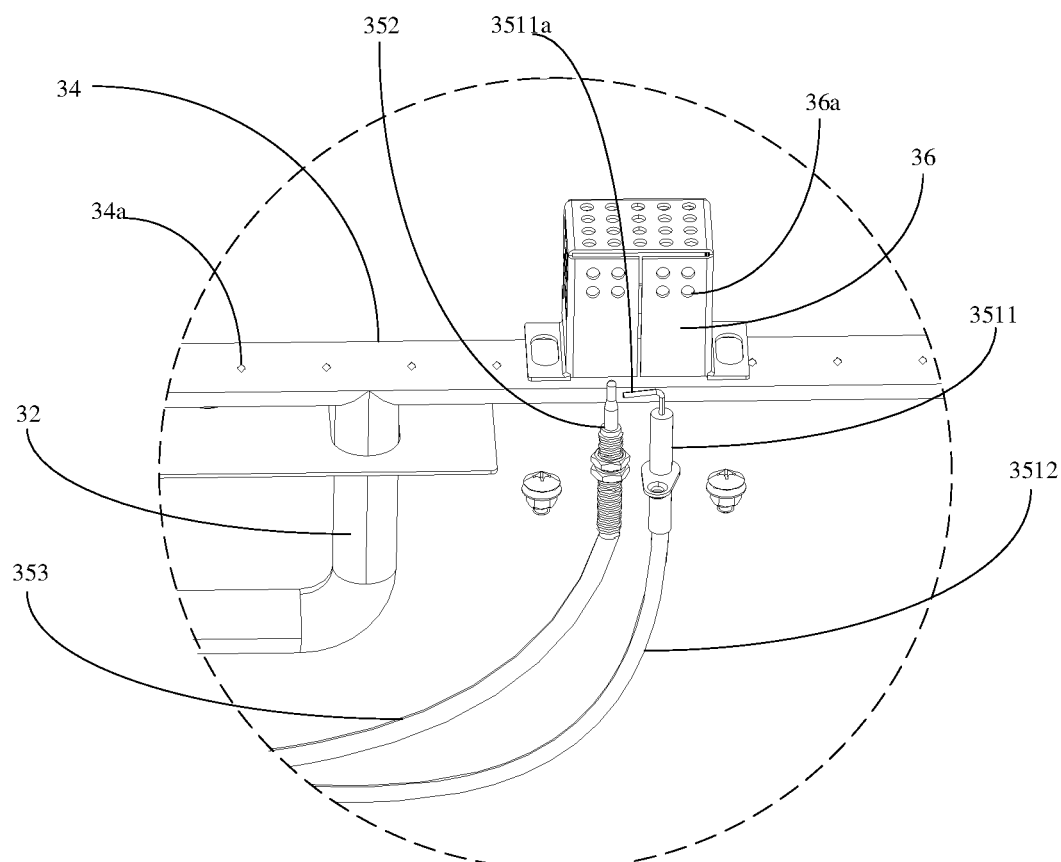
FIG. 3 is an enlarged schematic view at portion B in FIG. 1.

In order to ensure the safety of the heating assembly 3 in use, as shown in FIG. 1 to FIG. 3, in an embodiment of the present disclosure, the heating assembly 3 includes an ignition control device 35. The ignition control device 35 includes an ignition mechanism 351, and the ignition mechanism 351 includes an ignition needle 3511 provided with an ignition port 3511a. The ignition needle 3511 communicates with the ignition mechanism 351 through a first wire 3512, and the ignition control device 35 further includes a sensing needle 352. The sensing needle 352 is electrically connected to the regulating valve 33 through a second wire 353, and is configured to sense a combustion signal. The heating assembly 3 further includes an ignition button 354 for adjusting the ignition mechanism 351, and the ignition port 3511a communicates with the combustion pipe 34. The ignition button 354 is configured to control the ignition mechanism 351 to ignite, and the flame is sprayed from the ignition port 3511a of the ignition needle 3511. Since the ignition port 3511a communicates with the combustion pipe 34 and the combustion pipe 34 is filled with the combustible gas, the combustion pipe 34 will start to burn. The sensing needle 352 can sense temperature, and when sensing that the combustion pipe 34 no longer burns, the sensing needle 352 will send a signal to the regulating valve 33 through the second wire 353, so that the regulating valve 33 will close. In this case, the combustible gas cannot enter the combustion pipe 34 from the second air inlet pipe 32, so that the second air inlet pipe 32 can be prevented from spraying combustible gas and causing gas poisoning of the user after the fire in the combustion pipe 34 is extinguished.

As shown in FIG. 1, in an embodiment of the present disclosure, an installation groove 22 is formed at an end of the table plate 2. The table plate 2 further includes a first base 221 and a cover plate 222 in the installation groove 22. The first base 221 can be detachably covered by the cover plate 222, and the regulating button 331 is spaced apart from the ignition button 354 in the first base 221. The cover plate 222 is provided with at least one first through hole 222a. The regulating button 331 and the ignition button 354 are hidden in the first base 221, and the cover plate 222 is configured to cover on the first base 221. The first through hole 222a is convenient for the user to screw and open the cover plate 222.

In order to collect combustible gas for a rapid ignition of the ignition needle 3511, as shown in FIG. 3, in an embodiment of the present disclosure, a gas collection cover 36 is provided on both peripheries of the sensing needle 352 and the ignition needle 3511, and the gas collection cover 36 is provided with a plurality of second through holes 36a. The gas collection cover 36 is used to collect the combustible gas, and is placed on both peripheries of the sensing needle 352 and the ignition needle 3511. The ignition port 3511a of the ignition needle 3511 will spray flames, and the combustible gas collected in the gas collection cover 36 will burn when contacting the flames. The plurality of second through holes 36a are used to transmit the flame in the gas collection cover 36 to the combustion pipe 34, so that the combustible gas in the combustion pipe 34 will burn. In addition, the sensing needle 352 will sense temperature more accurately due to the collection of the gas collection cover 36, thereby sending a feedback signal to control the regulating valve 33 to close.

Figure 5:
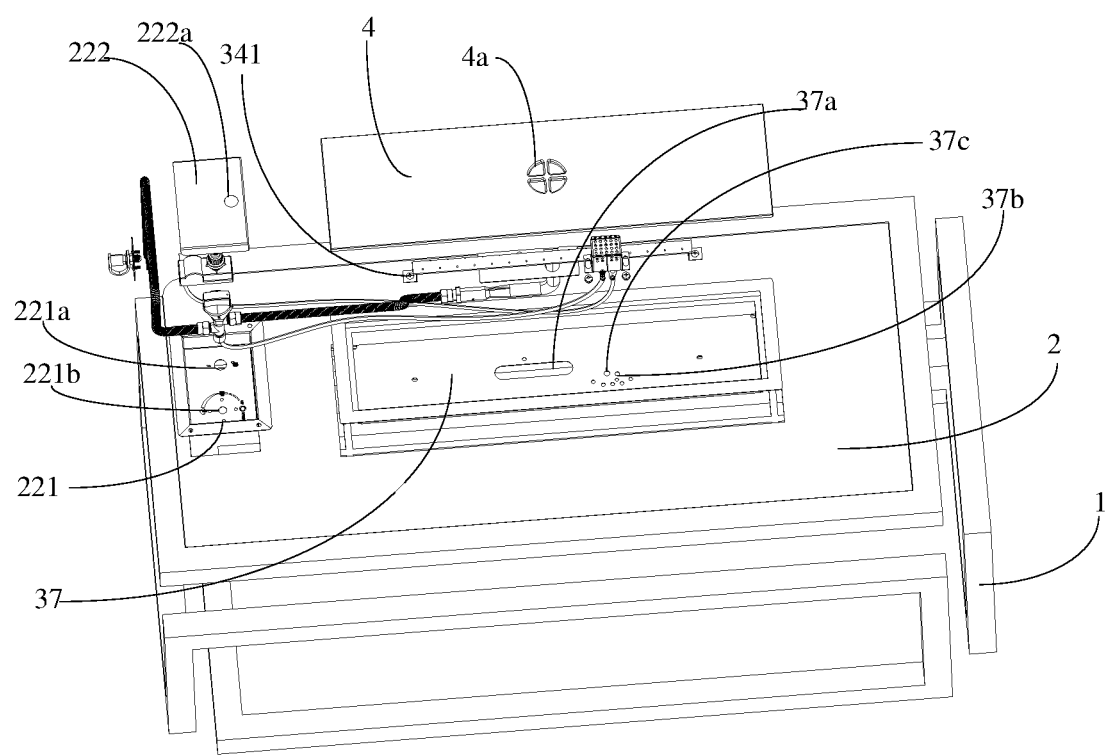
FIG. 5 is an exploded schematic structure view of the replaceable multifunctional heating table according to an embodiment of the present disclosure from a third perspective.

As shown in FIG. 5, in an embodiment, a second base 37 is provided under the combustion pipe 34, and the second base 37 is provided with a first perforation 37a for the second air inlet pipe 32 to pass through. An end of the second air inlet pipe 32 passes through the second base 37 and is provided in the second base 37 via the first perforation 37a, to supply gas to the combustion pipe 34.

In an embodiment, the second base 37 is provided with a second perforation 37b for the ignition needle 3511 to pass through. The ignition needle 3511 passes through the second base 37 and is provided at the second base 37 via the second perforation 37b, to supply flames to the combustion pipe 34.

In an embodiment, the second base 37 is provided with a third perforation 37c for the sensing needle 352 to pass through. The sensing needle 352 passes through the second base 37 and is provided at the second base 37 via the third perforation 37c, to sense the temperature of the combustion pipe 34 and then control the regulating valve 33 to close.

It should be noted that, in an embodiment, one of the three technical features mentioned above can be chosen, or all the three technical features mentioned above are chosen at the same time. In this embodiment, all the three technical features mentioned above are chosen at the same time, and a second base 37 is provided under the combustion pipe 34. The second base 37 is provided with a first perforation 37a for the second air inlet pipe 32 to pass through, a second perforation 37b for the ignition needle 3511 to pass through, and a third perforation 37c for the sensing needle 352 to pass through. An end of the second air inlet pipe 32 passes through the second base 37 and is provided at the second base 37 via the first perforation 37a, to supply gas to the combustion pipe 34. The ignition needle 3511 passes through the second base 37 and is provided at the second base 37 via the second perforation 37b, to supply flames to the combustion pipe 34. The sensing needle 352 passes through the second base 37 and is provided at the second base 37 via the third perforation 37c, to sense the temperature of the combustion pipe 34 and then control the regulating valve 33 to close. When heating is required, the flame port of the ignition needle 3511 will spray flames, then the combustible gas from the second air inlet pipe 32 will burn in the combustion pipe 34 after connecting with the flames. When the flame in the combustion pipe 34 is extinguished and the sensing needle 352 senses that the temperature is lower than the temperature during combustion, the feedback signal will be transmitted to the regulating valve 33 to control the regulating valve 33 to close. In this way, the second air inlet pipe 32 can be prevented from spraying combustible gas and causing gas poisoning of the user after the fire in the combustion pipe 34 is extinguished.

As shown in FIG. 5, in an embodiment, the first base 221 is provided with a fourth perforation 221a for the first wire 3512 to pass through. An end of the first wire 3512 connected to the ignition mechanism 351 passes through the fourth perforation 221a and is provided in the first base 221, so that the ignition button 354 can be placed in the first base 221 to improve the convenience of the user.

In an embodiment, the first base 221 is provided with a fifth perforation 221b for the second wire 353 to pass through. An end of the second wire 353 connected to the regulating valve 33 passes through the fifth perforation 221b and is placed in the first base 221, so that the regulating button 331 can be placed in the first base 221.

It should be noted that the two technical features mentioned above can be chosen alternatively, or can be chosen at the same time. In this embodiment, the two technical features mentioned above are chosen at the same time. The ignition button 354 is spaced apart from the regulating button 331 in the first base 221, and a cover plate 222 is configured to cover the first base 221. The user can control the heating assembly 3 to close or open by uncovering the cover plate 222, which is convenient for operation.

In order to prevent the combustion pipe 34 from scalding the user, as shown in FIG. 1 and FIG. 3, in an embodiment of the present disclosure, the combustion pipe 34 is provided with a plurality of third through holes 34a. The periphery of the combustion pipe 34 is provided with an outer furnace wall 38. An inner furnace wall 39 is provided between the outer furnace wall 38 and the combustion pipe 34, and a gap is formed between the outer furnace wall 38 and the inner furnace wall 39. The cover body 4 is detachably covered on the outer furnace wall 38, and the cover body 4 is provided with at least one fourth through hole 4a. The plurality of third through holes 34a are used for the release of the combustible gas in the combustion pipe 34. During the combustion process, due to the high temperature, the outer furnace wall 38 and the inner furnace wall 39 are placed on the periphery of the combustion pipe 34 to avoid scalding the user. In addition, there is a gap between the two furnace walls, which may play a heat insulation role, reduce the heat transfer efficiency and make the temperature of the outer furnace wall 38 lower than the inner furnace wall 39, thereby effectively avoiding scalding the user. The combustible gas generated after the combustion reaction can also be discharged via the fourth through hole 4a, to avoid safety problems caused by the too high temperature.

Further, as shown in FIG. 5, in an embodiment of the present disclosure, both ends of the combustion pipe 34 are provided with a support base 341, and the support base 341 is installed on the inner furnace wall 39. The support base 341 is used to support the combustion pipe 34, to avoid a direct contact between the bottom of the combustion pipe 34 and the inner furnace wall 39. In this way, the contact area between the combustion pipe 34 and the combustion gas can be increased for better combustion effect.

To make the table frame 1 stably support the desktop plate 2, in an embodiment of the present disclosure, a head end of the table frame 1 is connected with a tail end of the table frame 1, forming a stable frame along both a length direction and a width direction of the table frame.

The above-mentioned embodiments are some embodiments of the present disclosure, and do not therefore limit the scope of the present disclosure. Under the inventive concept of the present disclosure, the equivalent structural transformations made by the present disclosure, or directly/indirectly applied in other related arts, are all within the present disclosure.

What is claimed is:

1. A replaceable multifunctional heating table, comprising:
    a table frame, wherein a desktop plate is provided at an upper end of the table frame, and an installation hole is formed in a middle portion of the desktop plate;
    a heating assembly comprising a combustion pipe, wherein the combustion pipe is provided inside the table frame and is corresponding to the installation hole; and
    an extension structure comprising a cover, a tea set and a grill,
    wherein one of the cover, the tea set and the grill is provided on the installation hole to make the replaceable multifunctional heating table have a plurality of usage modes;
    the table frame is hollow, and comprises an air inlet port and an air outlet port, and the air inlet port is circumscribed to a pressure reducing valve;
    the heating assembly further comprises a first air inlet pipe, a second air inlet pipe and a regulating valve, the first air inlet pipe enters the table frame via the air inlet port, and leaves the table frame via the air outlet port, the first air inlet pipe is connected to the second air inlet pipe through the regulating valve, and the second air inlet pipe communicates with the combustion pipe; and
    the heating assembly further comprises a regulating button for adjusting the regulating valve.

2. The replaceable multifunctional heating table of claim 1, wherein:
    the heating assembly comprises an ignition control device,
    the ignition control device comprises an ignition mechanism, and the ignition mechanism comprises an ignition needle provided with an ignition port, and the ignition needle communicates with the ignition mechanism through a first wire,
    the ignition control device further comprises a sensing needle, and the sensing needle is electrically connected to the regulating valve through a second wire, and is configured to sense a combustion signal, and
    the heating assembly further comprises an ignition button for adjusting the ignition mechanism, and the ignition port communicates with the combustion pipe.

3. The replaceable multifunctional heating table of claim 2, wherein:
    an installation groove is formed at an end of the desktop plate,
    the desktop plate further comprises a first base and a cover plate in the installation groove, the first base is detachably covered by the cover plate, and the regulating button is spaced apart from the ignition button in the first base, and
    the cover plate is provided with at least one first through hole.

4. The replaceable multifunctional heating table of claim 3, wherein the first base is provided with a fourth perforation for the first wire to pass through, and a fifth perforation for the second wire to pass through.

5. The replaceable multifunctional heating table of claim 2, wherein a gas collection cover is provided on both peripheries of the sensing needle and the ignition needle, and the gas collection cover is provided with a plurality of second through holes.

6. The replaceable multifunctional heating table of claim 2, wherein:
    a second base is provided under the combustion pipe, and the second base is provided with a first perforation for the second air inlet pipe to pass through, a second perforation for the ignition needle to pass through, and a third perforation for the sensing needle to pass through.

7. The replaceable multifunctional heating table of claim 1, wherein:
    the combustion pipe is provided with a plurality of third through holes,
    a periphery of the combustion pipe is provided with an outer furnace wall, an inner furnace wall is provided between the outer furnace wall and the combustion pipe, and a gap is formed between the outer furnace wall and the inner furnace wall, and the outer furnace wall is detachably covered by the cover body, and the cover body is provided with at least one fourth through hole.

8. The replaceable multifunctional heating table of claim 7, wherein both ends of the combustion pipe are provided with a support base, and the support base is installed on the inner furnace wall.

9. The replaceable multifunctional heating table of claim 1, wherein a head end of the table frame is connected to a tail end of the table frame, forming a frame along both a length direction and a width direction of the table frame.

* * * * *